United States Patent [19]

Nordebo

[11] 4,075,521
[45] Feb. 21, 1978

[54] MULTI-PHASE GENERATOR WITHOUT SLIP RINGS AND BRUSHES

[76] Inventor: Knut Assar Nordebo, Ringvagen 28, Haparanda, Sweden, S-953 00

[21] Appl. No.: 690,597

[22] Filed: May 27, 1976

[30] Foreign Application Priority Data

June 6, 1975 Sweden ............................ 7506491

[51] Int. Cl.² ............................................. H02K 3/00
[52] U.S. Cl. ..................................... 310/184; 310/171
[58] Field of Search ............... 310/180, 179, 184, 185, 310/186, 187, 188, 198, 201–208, 210, 259, 269, 171, 168; 322/95, 63–66

[56] References Cited

U.S. PATENT DOCUMENTS

| | | | |
|---|---|---|---|
| 2,761,082 | 8/1956 | Chang | 310/187 |
| 2,790,098 | 4/1957 | Nyyssonen | 310/202 |
| 2,790,099 | 4/1957 | Nyyssonen | 310/202 |
| 2,827,582 | 3/1958 | Krebs | 310/202 |
| 2,947,894 | 8/1960 | Strang | 310/202 |
| 3,157,810 | 11/1964 | Adkins | 310/180 |
| 3,535,572 | 10/1970 | De Rugeris | 310/185 |

*Primary Examiner*—R. Skudy
*Attorney, Agent, or Firm*—Burns, Doane, Swecker & Mathis

[57] ABSTRACT

A multi-phase generator without slip rings and brushes and with no windings in its rotor has in its stator an exciting winding and an alternating current winding, mutually displaced half a stator pole pitch. The generator has an additional alternating current winding having a coil pitch about half that one of the original alternating current winding. The additional winding has a coil in each stator pole surface disposed in slots symmetrical in relation to a central slot for the original alternating current winding. For each phase two oppositely disposed coils of each set of alternating current windings, said sets being displaced 90° (mechanical), are connected in series.

1 Claim, 5 Drawing Figures

MULTI-PHASE GENERATOR WITHOUT SLIP RINGS AND BRUSHES

This invention relates to a multi-phase generator without slip rings and brushes, of the type described in my co-pending application Ser. No. 452,448 filed Mar. 18, 1974, now U.S. Pat. No. 4,038,575, in which the rotor has no winding and like the poles of the stator is made of laminated dynamo sheet metal and in which an exciting winding and an alternating current winding are both disposed in the stator and are mutually displaced half a stator pole pitch. The exciting winding is disposed around each stator and the alternating winding is disposed between central slots in the stator poles. The stator poles form an even number m.p and the rotor poles form a number $m.(p\pm 1)$, where $m$ is a factor 1,2,3 ... and $p$ is an even number 2,4,6 ... Windings displaced in phase 180° (electrical) are arranged to obtain voltage maximum simultaneously and are connected to form one phase. The generator has a phase number $q = p/2$.

According to the invention an additional alternating current winding is now disposed in the generator for each phase, said winding having a coil pitch that is about half the coil pitch of the original alternating current winding and having a coil symmetrically disposed in relation to said central stator slot in additional slots, e.g. in two slots disposed in each stator pole, the coils of the additional alternating current winding being connected in series with those phase windings of the original alternating current winding in which voltage occurs substantially simultaneously.

The invention will be explained more in detail with reference to the description of the Figures on the accompanying drawings.

On these FIG. 1 shows a multi-phase generator of a known type, from which the invention originates and corresponds to the generator structure depicted in FIG. 3 of my aforesaid co-pending application Ser. No. 452,448, now U.S. Pat. No. 4,038,575.

Figure 1:
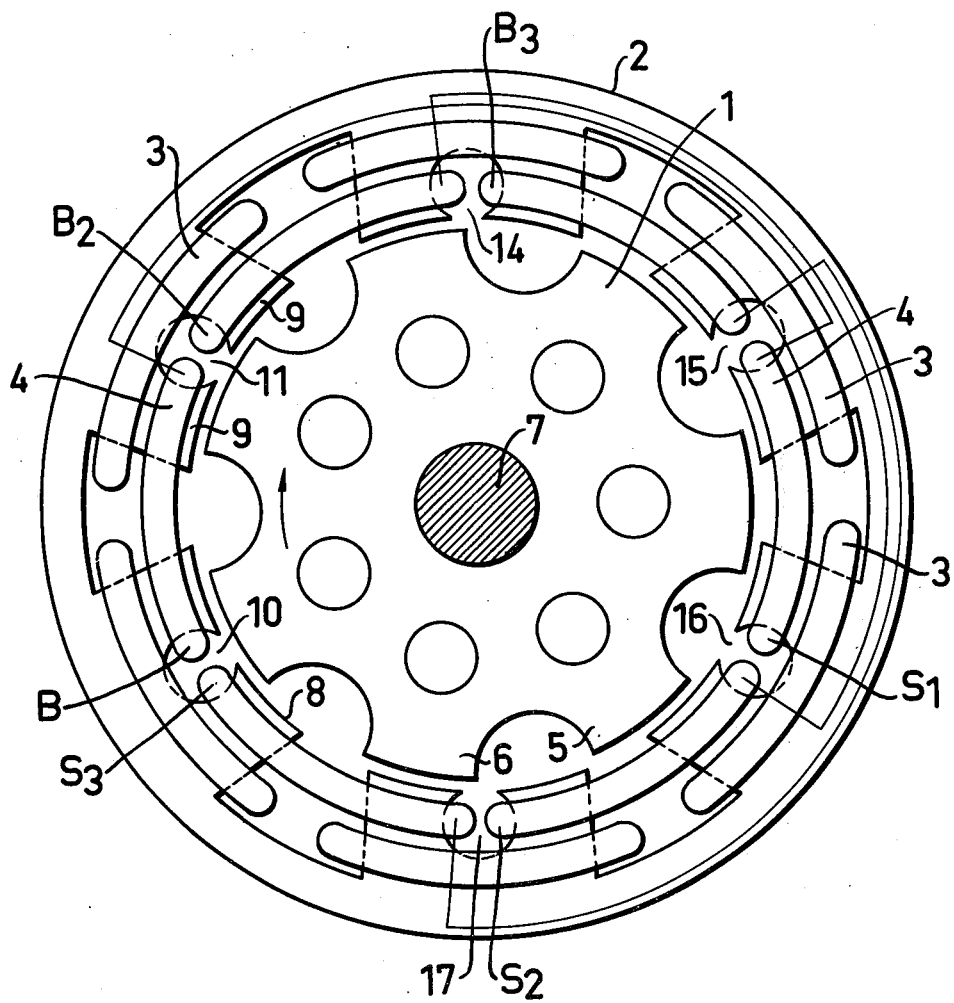

In the known multi-phase generator according to FIG. 1 the rotor 1 has seven poles, e.g. 5,6 and the stator 2 has six poles, e.g. 8,9. Each stator pole is surrounded by an exciting winding 3 and the original alternating current winding 4 is disposed between slots 10, 11, 14–17 in the stator pole surface, said slots being substantially central and axial. The rotor shaft is designated 7. The generator has three phases and the exciting windings are for the different phases designated $B_1$, $B_2$, $B_3$ for the beginnings of the phase windings and $S_1$, $S_2$, $S_3$ for their ends.

Figure 2:
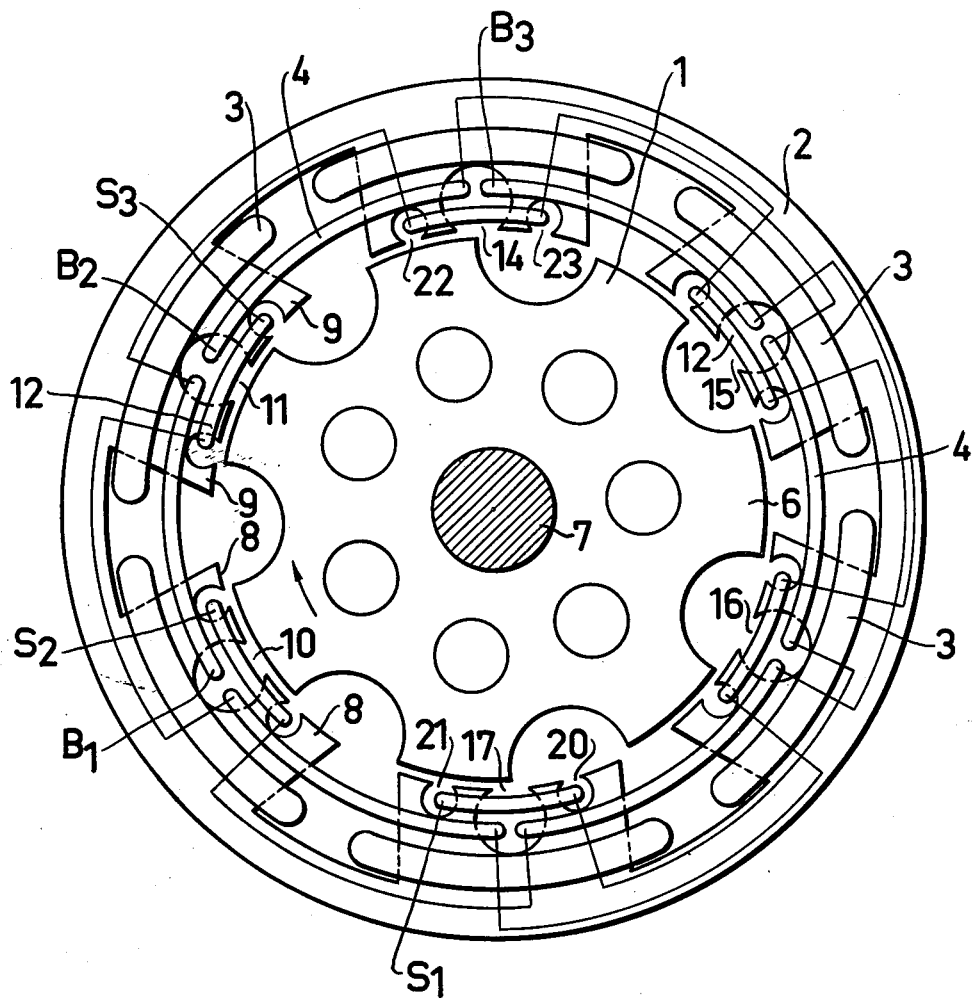
FIG. 2 shows the new alternating current windings.

The new, additional alternating current winding 12 according to FIG. 2 has a coil pitch that is equal to half the stator pole pitch, that is about equal to the width of the rotor pole. The original alternating current winding 4 has a coil pitch that is equal to the stator pole pitch. The slots, e.g. 20, 21 of the additional alternating current winding, are arranged symmetrically in relation to the central slot 17 of the original alternating current winding in the stator pole in question. It is apparent from FIG. 2 that the new winding for each phase consists of two oppositely disposed phase coils of the original alternating current winding 4 and of two oppositely disposed coils of the additional alternating current winding, said last-mentioned coils being displaced 90° (mechanical) from said original alternating current windings, and for each phase all said four coils being connected in series.

Figure 3:
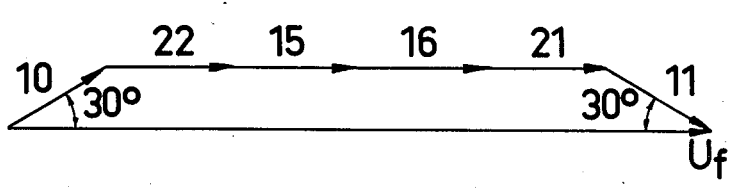
FIG. 3 shows a phase voltage diagram.

FIG. 3 shows the resulting phase voltage $U_f$ which is obtained of the slot coil voltages of one phase, said latter voltages being given numbers coinciding with the designations of the slots in the stator pole in question.

The new winding is subjected to a flux varying between zero and a maximum value, whereas the original alternating current winding is subjected to flux of equal magnitude, which, however, reverses its direction during its course. If the original alternating current winding has an electromotive force (e.m.f.) E and has N turns and if the new winding has also N turns the phase voltage will increase to about 1.5 E.

Figure 4:
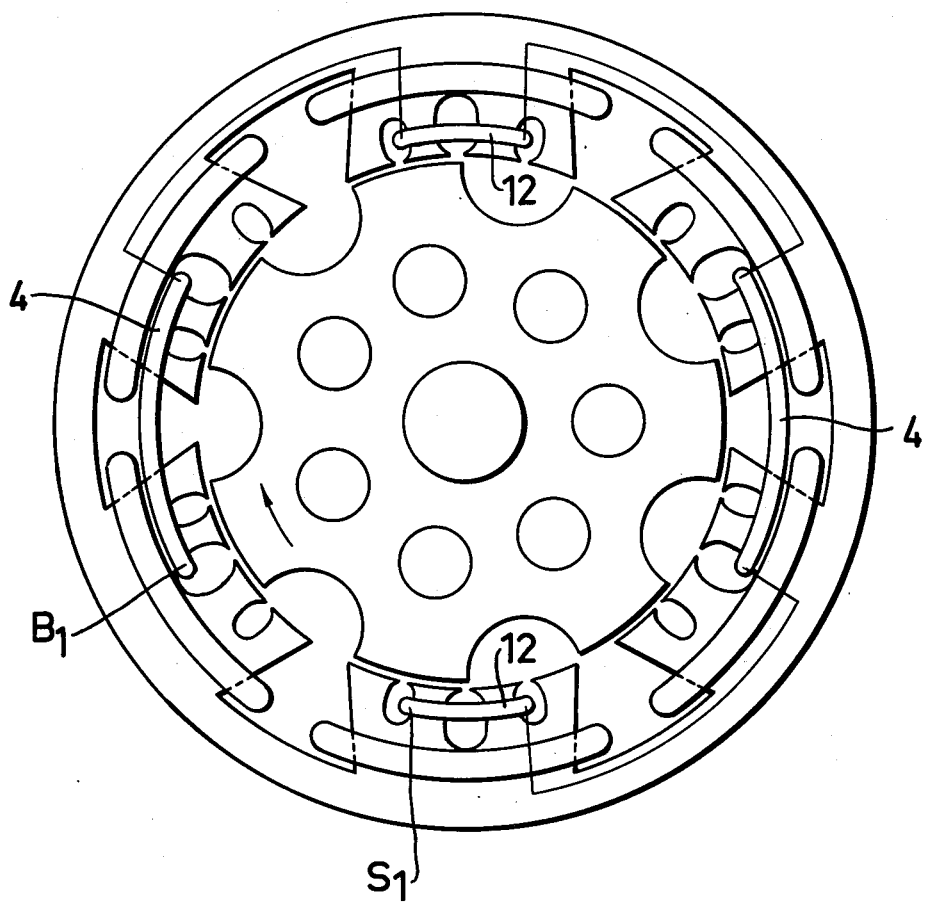
FIG. 4 shows the connection of alternating current windings for one phase.

The connection of the said four part coils 4 and 12 of the new winding according to FIG. 2 for one phase with the beginning $B_1$ and the end $S_1$ is shown more clearly in FIG. 4. The part coils 4 extend from pole centre to pole centre whereas the part coils 12 are symmetrically disposed in one pole surface.

Figure 5:
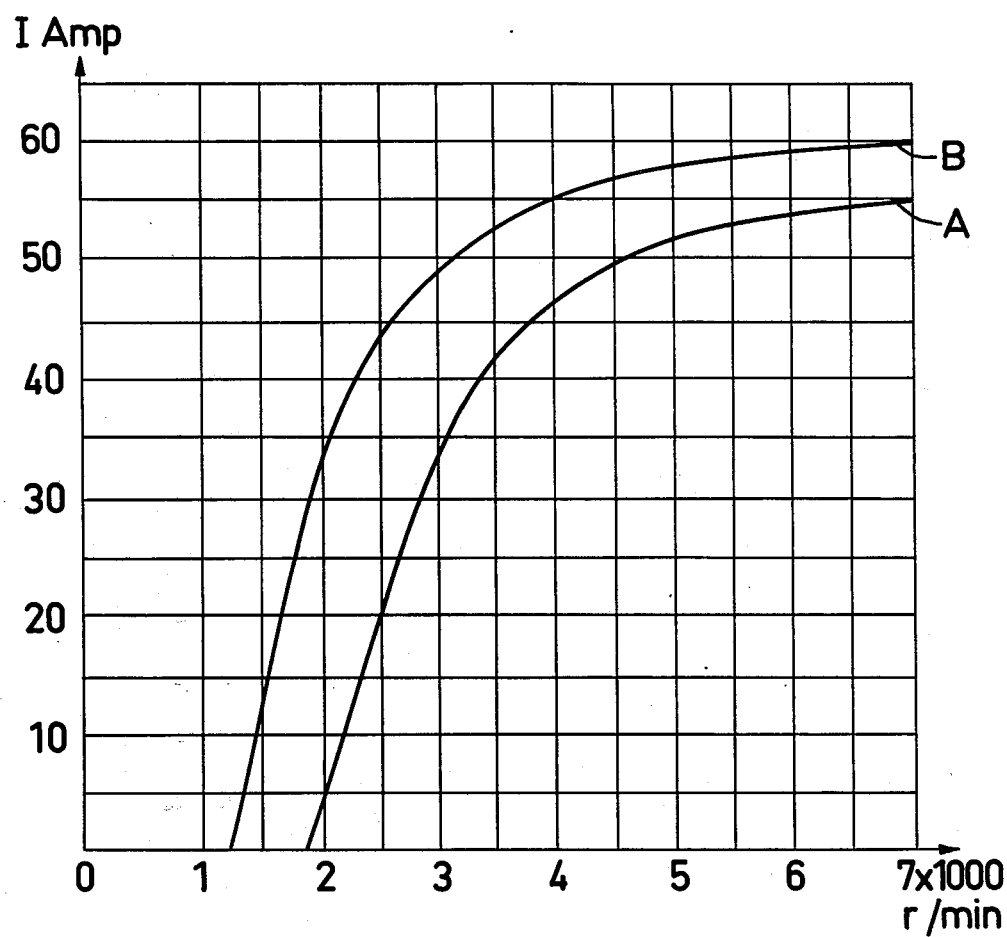
FIG. 5 shows charging curves of the generator.

The performance of the generator is apparent from FIG. 5 in a diagram of current 1 as a function of number of revolutions per minute. The lower curve A relates to a generator without the additional alternating current winding 12, whereas the upper curve B refers to a generator according to the invention with the said winding. At for instance 3000 revolutions per minute an increase of the indicated current from 32 to 48 amperes is obtained, which gives an increased power of 50%. The curves refer to generators used for charging purpose.

I claim:

1. A multi-phase induction generator including in combination, a rotor having a plurality of equally spaced poles but no windings thereon, a stator having a different number of equally spaced poles, each provided with a single centrally disposed slot, said motor and stator being mounted concentrically for relative rotation and with an air gap therebetween, a direct current energizable exciting winding mounted on said stator and encompassing each said stator pole for producing magnetic flux of the opposite sense in adjacent stator poles, and a multi-phase alternating current output winding mounted on said stator with the phase windings located respectively in the centrally disposed slots of adjacent stator poles, thereby to achieve a mutual displacement of half a pole pitch between said exciting winding and said multi-phase output winding, said multi-phase output winding producing a multi-phase output voltage between beginning and end terminals of each stator phase winding, the number of stator poles being equal to m.p, the number of rotor poles being equal to $m(p\pm 1)$, $m$ being an integer factor 1, 2, 3, ..., and $p$ being an even integer factor 2, 4, 6, ..., an additional multi-phase alternating current winding mounted on said stator and having a coil pitch of about half the coil pitch of the said multi-phase output winding, said additional multi-phase winding having phase windings located in an additional pair of slots of each stator pole, said additional pair of slots being symmetrically disposed in relation to the central slot of each stator pole, the phase windings of said additional multi-phase winding being connected in series with those phase windings of said multi-phase output winding in which voltage occurs substantially simultaneously.

* * * * *